April 11, 1961 C. J. ZARCONE 2,979,565

MULTIPLEXING SYNCHRONIZER

Filed April 15, 1959 6 Sheets-Sheet 1

INVENTOR
CARL J. ZARCONE
BY
Richard G. Stahr
ATTORNEY

MULTIPLEXING SYNCHRONIZER

Filed April 15, 1959 6 Sheets-Sheet 3

April 11, 1961 C. J. ZARCONE 2,979,565

MULTIPLEXING SYNCHRONIZER

Filed April 15, 1959 6 Sheets-Sheet 5

April 11, 1961 C. J. ZARCONE 2,979,565

MULTIPLEXING SYNCHRONIZER

Filed April 15, 1959 6 Sheets-Sheet 6

United States Patent Office 2,979,565

Patented Apr. 11, 1961

2,979,565

MULTIPLEXING SYNCHRONIZER

Carl J. Zarcone, Rochester, N.Y., assignor to General Dynamics Corporation, Rochester, N.Y., a corporation of Delaware Filed Apr. 15, 1959, Ser. No. 806,520

6 Claims. (Cl. 178—50)

This invention relates to signaling systems and particularly to the reception and recognition of codes in a signaling system where items of information are represented each by a train of serially related pulses whereby the received codes are automatically distributed to a plurality of different outgoing channels and their bits are maintained in proper synchronous relation with respect to registering means therefor.

The object of the invention is to provide means at the receiving end of a multiplex transmission line to employ the codes transmitted thereover both to keep the receiving apparatus in condition to receive the codes both in proper order and in proper timing order within each code.

My copending application, Serial Number 804,377, filed April 6, 1959, discloses the transmitting end of a multiplex transmission line and discloses in detail certain parts of the circuitry and certain devices which are used herein, whereby such copending application is incorporated herein by reference and made a part hereof.

Certain components, such as AND circuits, OR circuits, inhibitors, flip-flops, multivibrators, delay multivibrators and so forth, are explained in detail in said application and binary count down chains are disclosed and explained. It is shown how such binary chains may be adjusted to count any given number less than the full capacity thereof, for instance, how a chain of three flip-flops capable of expressing $2^0$, $2^1$ and $2^2$ and therefore capable of expressing 0 to 7 (000) to (111) may, by resetting the $2^1$ flip-flop to zero as the chain advances from 000 to 111 to make 101, be made to count 6 instead of 8. Through the same principles such chains, particularly as disclosed herein, may be reset to express any given number from any stage in their operation. Thus, where a chain of seven such flip-flops are used to generate the channel selection signals in a given order, the occurrence of a particular code may be used to recycle the operation of such chain from any point to the exact point in the cycle where such particular code should occur. This may be done by using the occurrence of this particular code, known herein as the Frame Synchronizing Code, to turn certain of said flip-flops OFF and certain others ON. This not only recycles the chain to restart at a particular point but to limit its counting cycle to the particular number to be counted. In normal operation this recycling operation always takes place at the same point but the proper operation of the chain is not limited to this since means is provided to recycle the operation from any point. By this means, what is known as Frame synchronization may be achieved.

As in my said copending application, two such chains are used in cascade, the first being used to count clock pulses and to provide a channel counting train of signals for each six clock pulses, there being six code places in the conventional start stop printing telegraph code, the start, 1, 2, 3, 4 and 5 being counted (and the conventional stop pulse being disregarded, since it is invariable).

Since the transmission is a long train of mark pulses, means must be provided not only to switch the various codes to the counterpart of the line from which they were derived but also to see that the six pulses in their proper order are placed within each channel selection interval. This is known as Character Synchronism and is achieved by the use of a stand-by circuit constructed and arranged to respond in one manner to a particular code which is frequently included in the train of codes being transmitted and to respond in another manner when some mutilated or out of synchronism code starting with the first two bits of said particular code occurs but deviates therefrom in one or more of the following four bits. When this stand-by circuit responds in this and said other manner, it introduces another count in the clock pulse counter and recycles it to start one pulse later whereby the transmission is shifted one clock pulse and will therefore very shortly achieve Character Synchronism.

A feature of the invention is a means responsive to a long train of incoming information signals applied at random to the circuits of the present invention for achieving Character Synchronism from random occurrences of a given train of two signals, combined with a particular stage in the operation of the clock pulse counter, that is to adjust the operation of the said clock pulse counter so that it operates strictly in step with the incoming pulses constituting a complete and proper code. In accordance with this feature this circuit will start its supervisory operation upon the occurrence of a space bit followed immediately by a mark bit as the first two bits of a code and either accept or reject the following four bits. Acceptance means that no supervisory action will be taken but rejection means that the operation of the six clock pulse counter will be stretched over another pulse interval so as to align the six pulses being counted with another configuration until this stand-by supervisory circuits succeeds in recognizing a code which it may accept. This takes little time since the codes which the supervisory circuit may accept are scattered generously among the codes being transmitted. Since the conventional start-stop printing telegraph code may be transmitted at the rate of ten per second, the frame timing may be taken to be approximately one hundred milliseconds and since any number of telegraph channels say, by way of example, fifty, may be multiplexed and further since the special code which this supervisory circuit may accept is practically bound to be detected in several channels for each frame cycle of operations, it will be seen that the said supervisory circuit will succeed in its mission in a very short time.

Character Synchronism having been achieved, it now remains for the decoder or channel selection signal chain to be adjusted in its operation so that each incoming code will be delivered to the proper outgoing channel. This is achieved by the use of a special Frame Synchronizing code, included in the train of codes being transmitted and the use of a detector thereof which will act to recycle the channel selector chain from any point in the operation thereof to restart at such Frame Synchronizing code to thereafter deliver each succeeding code to its proper channel.

Thus, regardless of the point in the succession of the information signals being transmitted over the line at which the circuitry of the present invention is applied, the Character Synchronizing circuit will adjust the six clock pulse counter to achieve Character Synchronism and the Frame Synchronizing circuit will recycle the channel selector counting chain to achieve Frame Synchronism.

Other features will appear hereinafter.

The drawings consist of six sheets having ten figures, as follows.

Figure 2:
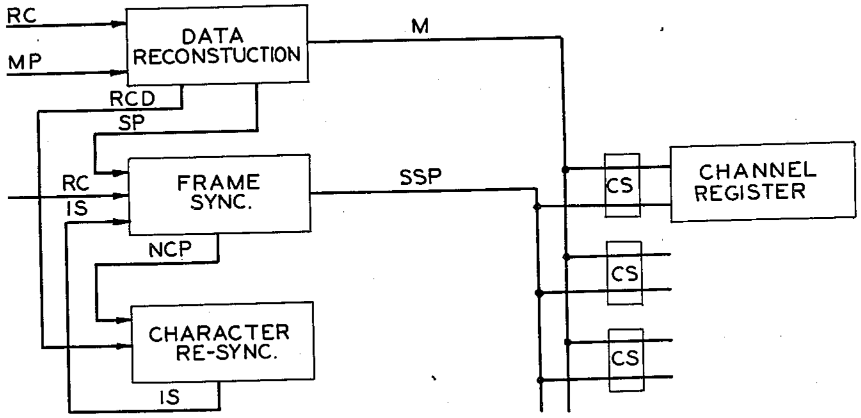
Fig. 2 is a block diagram showing the relationship of certain elements of the present invention, consisting of the data reconstruction circuit, the two synchronizing circuits, one for achieving Frame Synchronization and the other for achieving Character Synchronization and indicating the relationship thereof with the plurality of channel registers.
Figure 3:
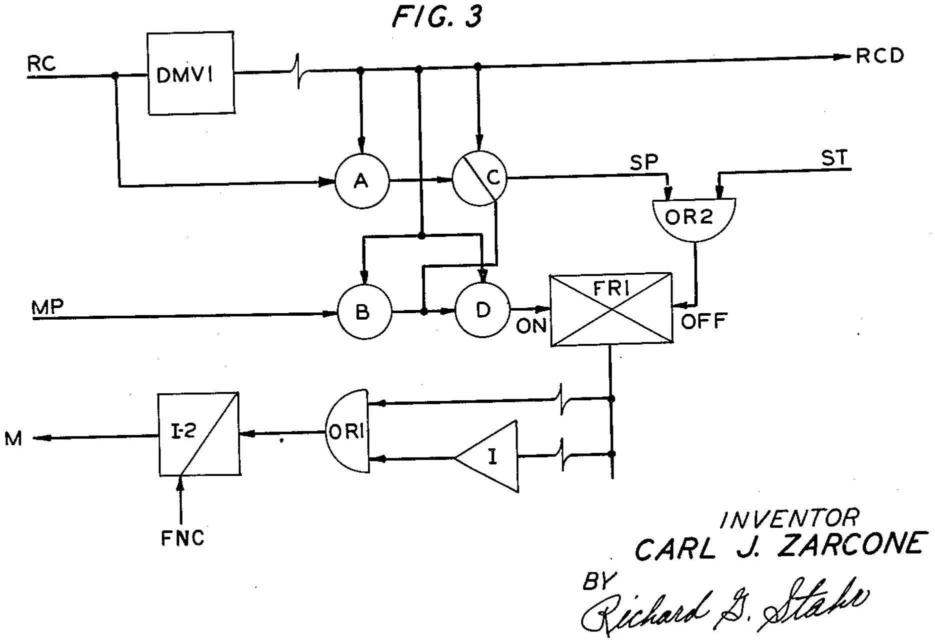
Figure 4:
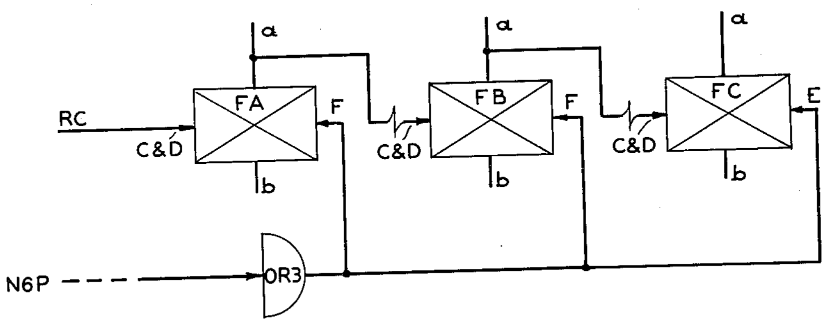
Figure 5:
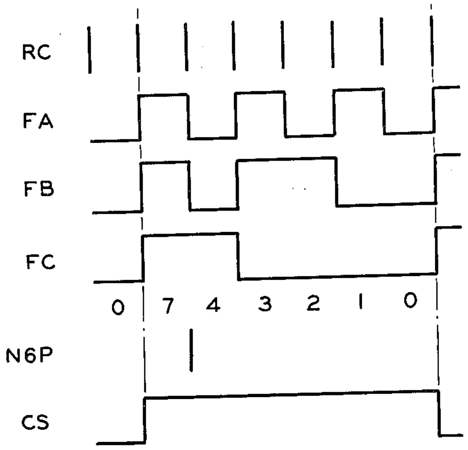
Figure 6:
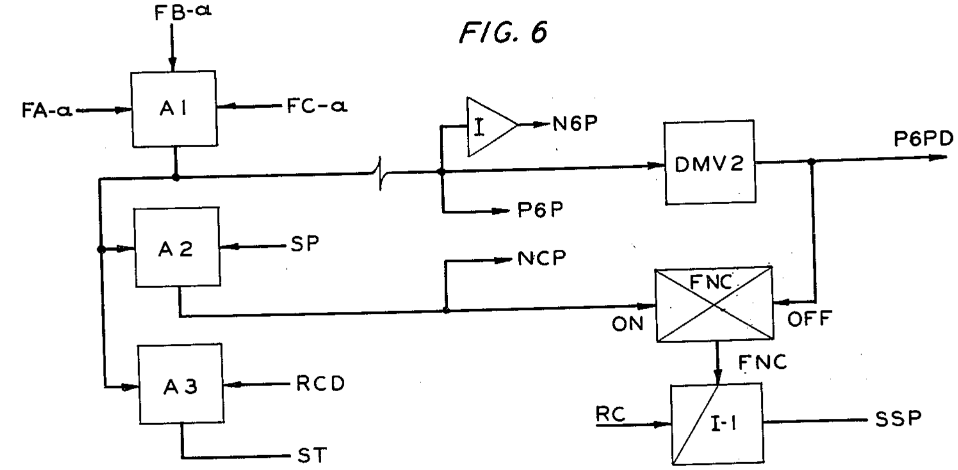
Figure 7:
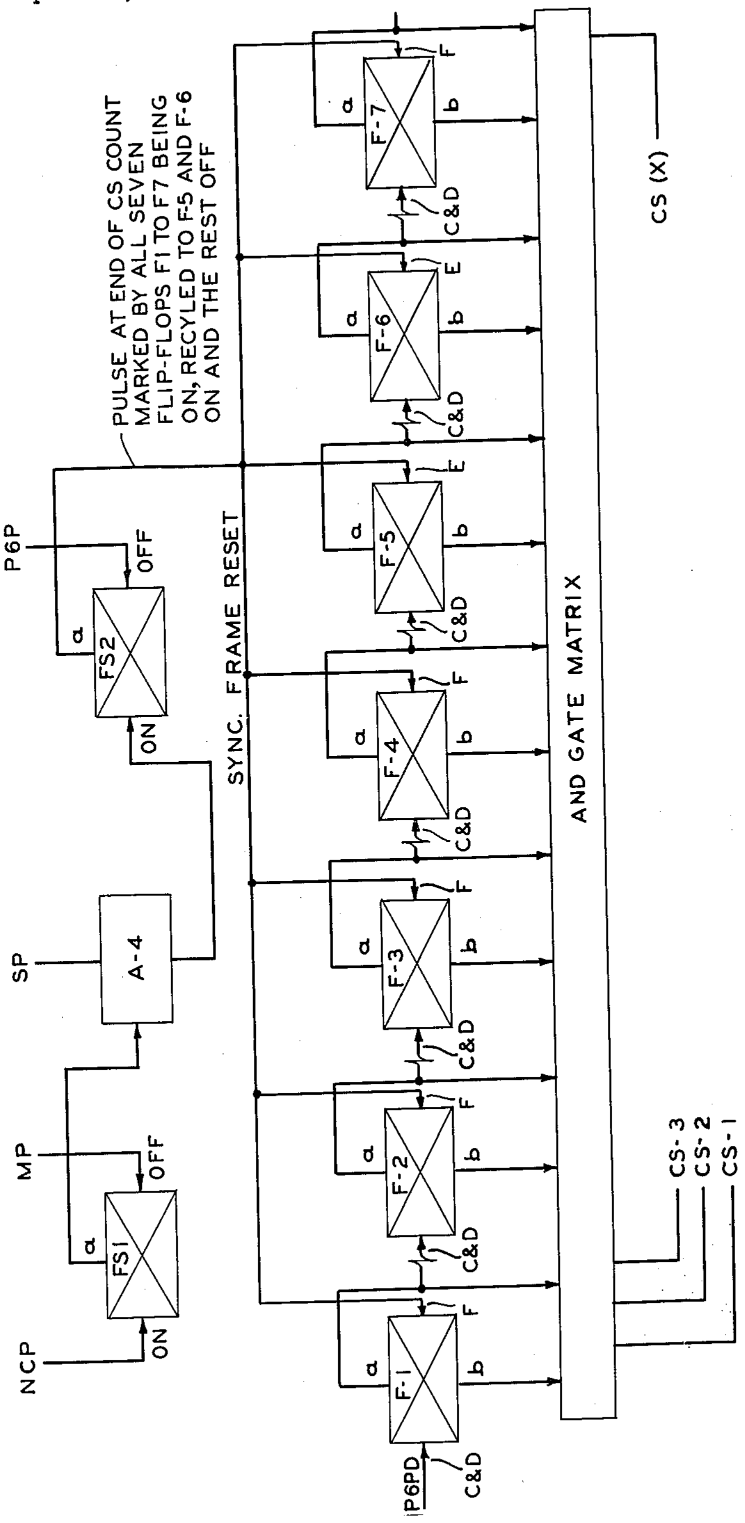
Figure 8:
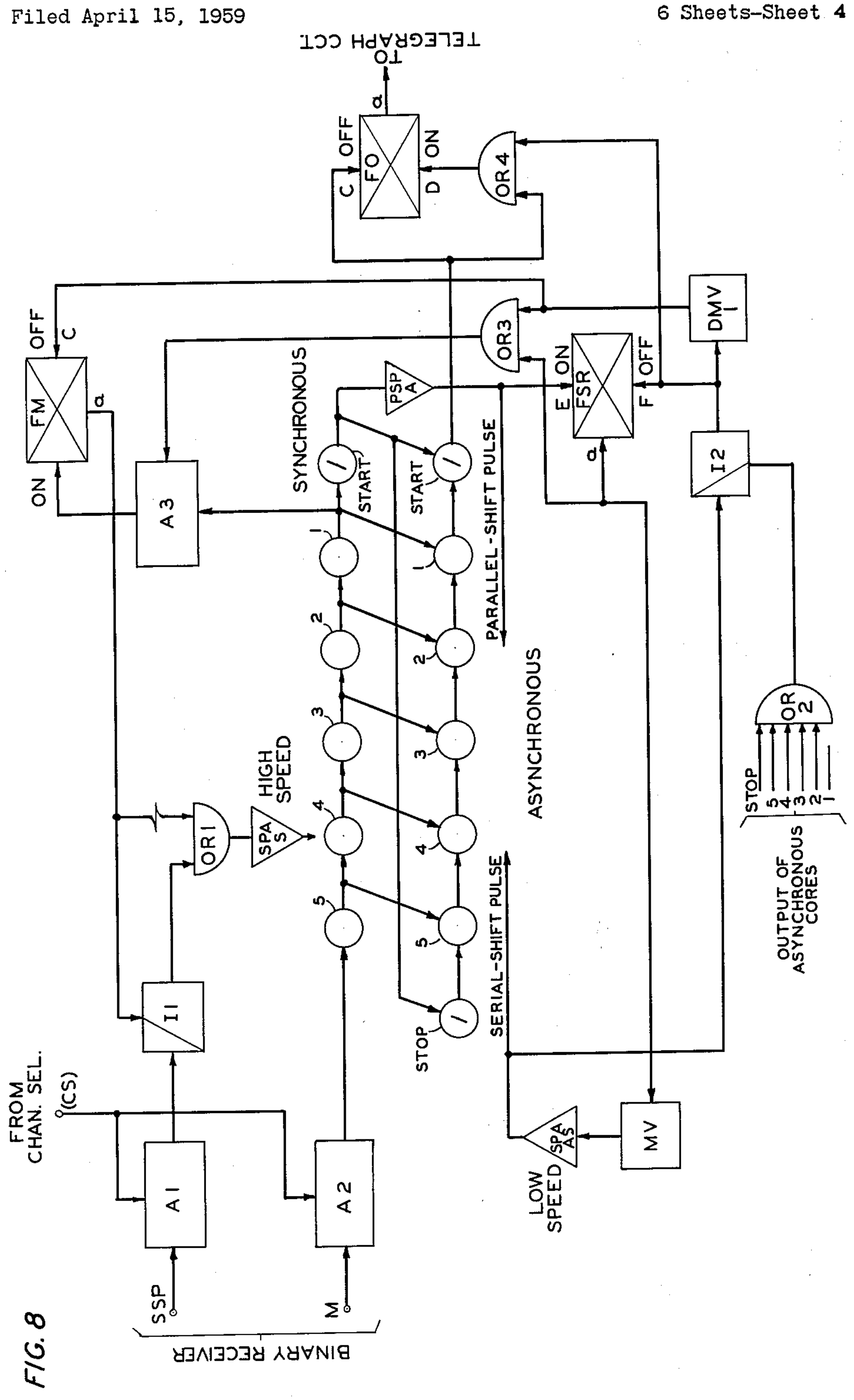
Figure 9:
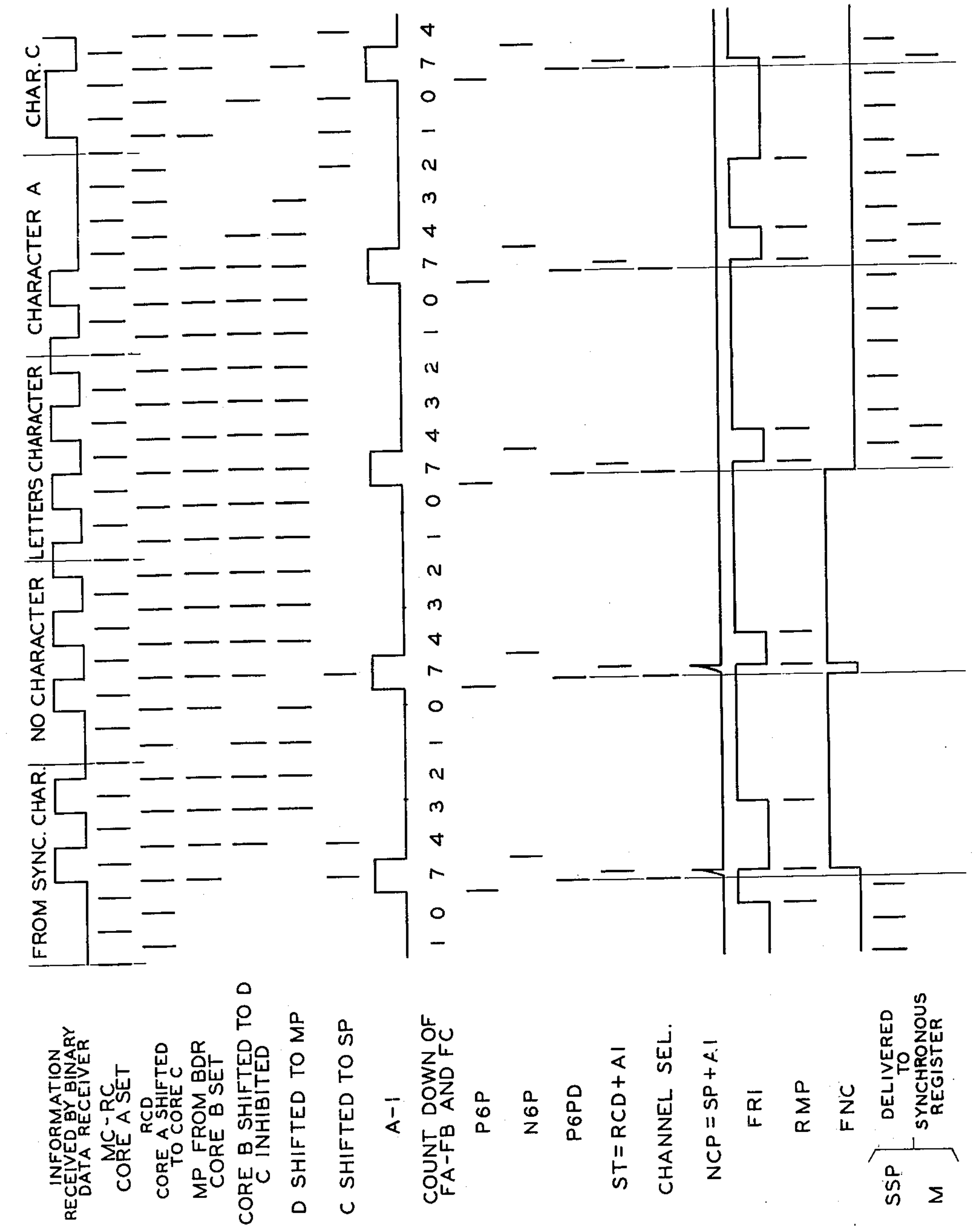
Figure 10:
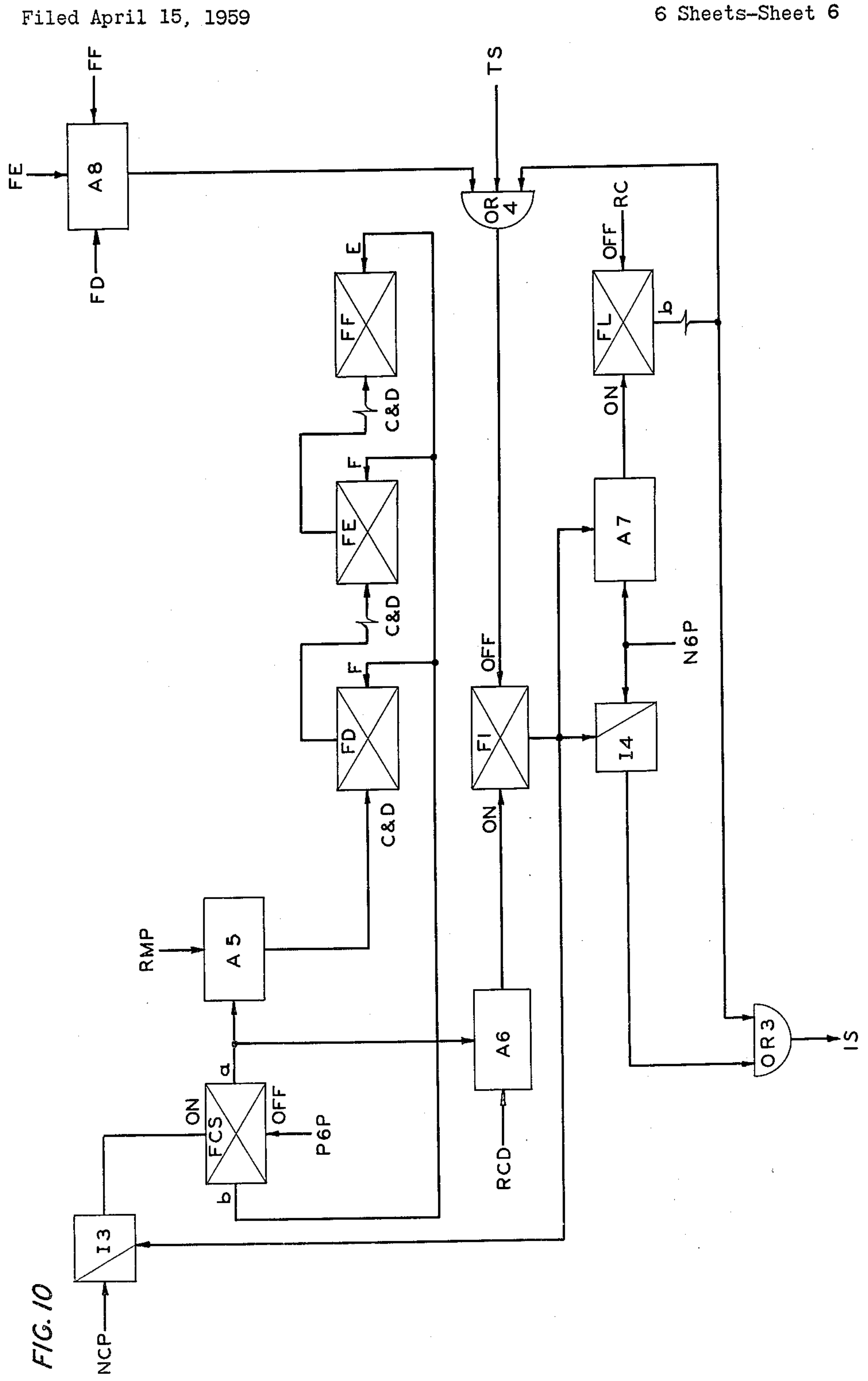

Fig. 3 is a schematic logical circuit diagram showing the data reconstruction circuit whereby the train of incoming mark pulses is provided with a positive signal space pulse fitted into each gap in the said train of mark pulses and the resulting train of mark and space pulses are integrated or translated into a train of reconstructed mark pulses which may be further translated by the output of a channel register into a conventional start stop printing telegraph code;

Fig. 4 is a schematic logical circuit diagram of the clock pulse counter for counting off six clock pulses per channel selection signal and showing the recycling circuit by which this counter may be recycled normally at the termination of the sixth clock pulse or may, alternatively, be recycled one clock pulse later to achieve Character Synchronization;

Fig. 5 is a sequence chart showing the normal operation of the six clock pulse counter of Fig. 4 and indicating the count down sequence whereby the normal count down values achieved by such a counter is interrupted and changed by a pulse derived by the counter at the termination of the signal resulting from the simultaneous ON state of the three flip-flops of the counter;

Fig. 6 is a schematic logical circuit diagram, actually companion to Fig. 3 showing how the serial shift pulses SSP are derived and controlled for delivery along with the reconstructed mark pulses to the various channel registers as indicated in Fig. 2 and also showing how the pulses for driving the channel selection chain are derived;

Fig. 7 is a schematic logical circuit diagram showing the counting chain for operating the channel selection AND gate matrix and in some detail the circuit controlled by the Frame Synchronizing Character for recycling the said chain;

Fig. 8 is a schematic logical circuit diagram of an individual channel register into which the high speed reconstructed codes are delivered and out of which the comparatively low speed codes to the individual printing telegraph devices are emitted;

Fig. 9 is a sequence chart by which the process of reconstruction of the information received by the binary data receiver into the mark pulses and the serial shift pulses which are delivered to the channel registers may be followed; and Fig. 10 is a schematic logical circuit diagram of a stand-by circuit which continually scans certain of the incoming codes to determine if they are in correct synchronism and which operates on other out of step codes to delay the operation of the counters used for the correct timing of the operations of the device of the present invention.

In my copending application Serial Number 804,377, filed April 6, 1959, there is shown a system for multiplexing a plurality of telegraph channels into a single transmission line. One of the control elements in that system is a master clock for supplying a continuous train of accurately timed pulses, all the operations of such a transmitting device being controlled by this master clock. In the present system, where synchronizing means are disclosed to expose the distant ends of the various telegraph channels to their transmitting counterparts in proper sequence and at corresponding times a so-called receiver clock is employed, operating at exactly the same frequency and in phase with the said master clock. This receiver clock is located within the binary data receiver into which the transmission line feeds and is maintained in highly accurate synchronism with the distant master clock by the pulses being transmitted even though these do not come in as an unbroken train. Whereas means are used to transmit as dense a stream of pulses as possible, such as inverting the conventional space start pulse of each telegraph code into a mark pulse and synthesizing a "No Character" code of all mark pulses, experience has proved that several codes or intervals may pass without the transmission of a single mark pulse without disturbing the synchronous operation of this receiver clock.

Given a binary data receiver containing such a highly accurate source of clock pulses in strict synchronism with the incoming multiplexed signals, the output of this receiver (herein considered conventional and therefore not shown in detail), the successively incoming codes may, by timing means controlled by this receiver clock, be distributed to the various telegraph code registers, shifted therein, in a synchronous part of the register at high speed, transferred to the asynchronous part of the register and thereafter shifted out of this asynchronous register at the conventional start-stop printing telegraph speed. To use the same example heretofore used in my said copending application, each CS (Channel Selector) interval will be two milliseconds, during which six code bits are serially entered into the synchronous register for transmission within a following period of 100 milliseconds to the conventional printing telegraph channel. This code, upon being entered into the synchronous register, is immediately shifted into the asynchronous register from which it is shifted out at lower speed for transmission over the printing telegraph channel. The transmission over the selected outgoing multiplex channel will be completed before another code is registered in the synchronous register.

It may be noted that proper timing rates to allow for a margin of safety is an engineering problem and will be established in a conventional manner. Thus the output of the asynchronous register becomes a continuous flow, the register being cleared each 100 milliseconds period, and a new code awaiting transfer thereto being entered into the synchronous register once each 100 milliseconds at some 2 millisecond period within the time taken to shift the registration out and into the printing telegraph circuit. It should be noted that the entry of codes into the synchronous register is very accurately timed and occurs with great regularity. It is not necessary that the transmission from the asynchronous register be so highly accurate, since the time between the stop pulse of one code and the start pulse of the following code is immaterial. Hence the timing arrangements, to allow for a margin of safety, may be an arrangement whereby the asynchronous register will be cleared in a lesser time than that elapsing between the entry of successive codes into the synchronous register.

Another arrangement explained in great detail in my copending application disclosing the means for synthesizing certain codes, such as the No Character code and the Frame Synchronizing code, is the counting arrangement consisting of a first counter for counting off the master clock pulses and creating a signal upon every sixth pulse and a second counter for counting off the output pulses of said first counter and for creating an ordinal, channel selection signal on each count thereof, of the length of six clock pulses and in regular sequence. Similar counting arrangements are provided herein as will appear in the following description.

Figure 1:
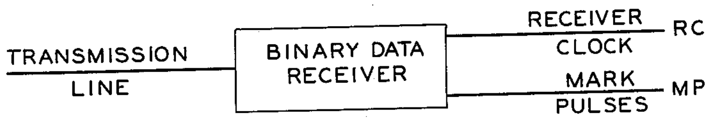
Fig. 1 is a block diagram indicating the relationship of the incoming transmission line, the binary data receiver and the two essential circuits emerging therefrom.

Fig. 1 is a simple schematic circuit diagram based on the indication in block form of a binary data receiver, into which the transmission line enters and out of which two principal conductors emerge, the RC, receiver clock conductor and the MP or mark pulse conductor. It has been stated that the binary data receiver, although of a complicated nature, is nevertheless considered conventional in this disclosure. It provides means responsive to an alternating high and low potential input in which each transition from a high to a low potential or from a low to a high potential represents a mark pulse and where each absence of such a transition in the time interval where a mark may have been present represents a space. It has further been noted that this binary data receiver contains as a part thereof a receiver clock which may be of the form of a free running multivibrator, timed to operate at the same frequency as a continuous train of mark pulses incoming over the transmission line and subject to frequency control whereby the RC receiver clock pulses transmitted from the binary data receiver are exactly synchronous with the master clock pulses at the distant transmitting end of the transmission line.

Fig. 2 is a block diagram showing how certain component circuits are interconnected and how the essential elements of the common receiver logic are arranged to reconstruct the data supplied by the binary data receiver for distribution through the various channel selector gates to the various channel registers.

The Data Reconstruction circuit shown in Fig. 3 is a means for constructing a space pulse in each gap in the train of mark pulses coming in from the binary receiver. Such a space pulse is derived by comparing the receiver clock pulses RC with the mark pulses MP over a given interval of time. Within a period of one bit, the pulse RC is stored in the core A. If a mark were present it would also be stored in core B. Thereafter a delayed receiver clock pulse RCD, applied to both core A and core B shifts this information from cores A and B into cores C and D respectively. If a mark pulse had been originally stored in core B, it would now inhibit the registration of a bit in core C. Therefore on the following shift pulse there would be no output from core C, but there would be an output from core D indicating that a mark pulse had been received during the interval of time being investigated. An absence of a mark pulse in core B would fail to block the path through core C and so on the following shift pulse, there would be an output pulse SP indicating that a space bit had been transmitted.

In order to fully reconstruct the data received, consideration must be given to the timing means employed. Fig. 4 shows a three stage count down chain consisting of the three flip-flops, FA, FB and FC, driven by the receiver clock RC. As explained in great detail in my said copending application, all three flip-flops will go ON upon the receipt of the first RC pulse and the value expressed by such chain will jump from 0 to 7 and an A–1 AND circuit controlled by the three *a* outputs of these flip-flops will provide an output, the purpose of which will be explained hereinafter, but which will include the generation of an N6P pulse as the chain advances from its expression of the value 7 to the expression of the value 6. However, the N6P pulse finds a path through an OR circuit and acts immediately over the F input of the FB flip-flop, as depicted in the sequence chart of Fig. 5, to reset the FB flip-flop so that the chain actually advances in its expression from 7 to 4 instead of from 7 to 6. Thus the count down pattern is 0, 7, 4, 3, 2, 1, 0, 7, 4, 3, etc. thus making an ordinal count of 6. It will appear hereinafter that the interval equal to six RC time intervals and known hereinafter as a CS (channel selection) interval extends from about one quarter of the interval valued at 7 to the same point in the next value 7, as shown in Fig. 5. This starting point is marked by the P6PD pulse which is derived as follows.

When the counting chain of Fig. 4 reaches the value 7 as expressed in Fig. 5, the A–1 AND circuit will produce an output which, on establishment, becomes a trigger pulse P6P and which, on termination, is inverted and becomes a trigger pulse N6P. The output of the AND circuit enters the delay multivibrator DMV2 and this produces an output P6PD slightly delayed beyond the P6P pulse. The train of P6PD pulses, six receiver clock intervals apart are used to drive the longer counting chain used for generating the CS signals as will more fully appear hereinafter.

It may now be noted that the A–2 AND circuit is controlled jointly by the output of the A–1 AND circuit and the SP space pulse produced in the circuit of Fig. 3. Since only the "No Character" and the Frame Synchronizing codes are headed by a space, it will appear that the output of the A–2 AND circuit, known as the NCP, will drive the flip-flop FNC ON and hence the FNC will provide an ON signal during the receipt of either a Frame Synchronizing code or a No Character code. The output of the FNC flip-flop (which will be terminated by the next P6PD pulse) acts to bar the path between the RC and the SSP conductor to prevent the transmission of shift pulses during the receipt of a No Character or Frame Synchronizing codes whereby mutilation of a registered code may be prevented.

Attention is directed to Fig. 7 where the second counting chain is shown schematically. This operates in the manner described in detail in my said copending application, being driven by a train of P6PD pulses each six receiver clock pulses apart. By means of the outputs of each of the flip-flops F–1 to F–7 inclusive, the AND Gate Matrix will derive the Channel Selection signals CS–1 to CS ($x$) inclusive. In accordance with the principles set forth in my copending application, this chain must be reset by a reset signal applied to certain of the flip-flops of this chain to confine the count to a given lesser number than the count of which the chain is capable. In accordance with the present invention, the reset pulse is derived from the incoming Frame Synchronizing code which is transmitted once for each cycle of operations. Thus the counter consisting of the flip-flops F–1 to F–7 may be reset in its proper count whenever the Frame Synchronizing code is received if in some manner the sequential operation of the channel selection signals has gotten out of step.

The Synchronizing Frame Reset pulse is derived by the detection of a train of two space pulses in the first and second code places in the Frame Synchronizing Character. It has been stated that both this character and the No Character character are headed by a space and that therefor an NCP is derived. In both cases then, the FS–1 flip-flop is turned ON and the AND circuit A–4 is readied for the receipt of the second code bit of the character. If this second code bit is a mark pulse, then the FS–1 flip-flop will be turned OFF and the AND circuit A–4 will be released. If, however, the second code bit of the character is a space (which definitely characterizes the code as the Frame Synchronizing Character) the AND circuit A–4 will produce an UP output and this, turning the FS–2 flip-flop ON, will produce the Synchronizing Frame Reset pulse. The FS–2 flip-flop will be turned OFF by the next P6P pulse in time for this circuit to test the next incoming character code.

Once a channel has been selected, AND gates, such as the A–1 and A–2 AND circuits in Fig. 8, will be opened to allow the reconstructed mark information and the serial shift pulses to be applied to that particular channel. However, when a code representing No Character is received, both the mark information and serial shift pulses must be inhibited so as to avoid the mutilation of information which may still be contained within the register. This is accomplished by first recognizing the No Character code. It will be recalled that this code starts with a space and this, as shown in the circuitry of Fig. 6, derives the NCP pulse, which sets the FNC flip-flop and this in turn operates the inhibitor I–1 whereby the RC clock pulses are prevented from reaching the SSP conductor. Therefore no shift pulses will be applied to the registers of Fig. 8.

A pulse ST, indicating the start of a character, which becomes necessary in the reconstruction of data, is obtained by gating the delayed receiver clock pulses RCD with the output of AND gate A–1 through AND gate A–3 as shown in Fig. 6.

The mark information received is now reconstructed into form whereby when this information is read out of the register of a given channel into the receiving printing telegraph device, it will be restored to the conventional printing telegraph code. Mark pulses MP will set the flip-flop FRI (Fig. 3) ON, while a space pulse SP or a start pulse ST, either, transmitted through the OR circuit OR–2 will reset or turn it OFF. The resulting pulse from the flip-flop FRI is then differentiated. The negative going differentiated pulse is inverted in the inverting amplifier I and through OR gate OR–1 and is combined with the positive going differentiated pulse. This is designated as the reconstructed mark pulse RMP and it will therefore appear that the first of these in a code being a mark pulse delivered by the core D and followed immediately by the start pulse ST will leave the flip-flop FRI OFF. Thereafter, a reconstructed mark pulse will be passed through the OR circuit OR–1 through the inhibitor I–2 only when there is a change in state. Thus in the transmission of the Letters Character, after the first mark pulse from the core D substantially followed by the ST pulse which first turns FRI ON and then OFF, the next MP will turn it ON but the following four MP pulses from the core D will not affect it since it is already ON. Thus the Letters Character will emerge from the inhibitor I–2 as an M pulse in the first and second code intervals and as no M pulses for the next four code intervals inclusive.

The reconstructed mark pulses which were developed by the No Character code are inhibited at Gate I–2 since the flip-flop FNC is turned ON by the NCP pulse so that FNC then remains ON until the next P6PD pulse which is only a fraction of an RCD interval before the time for the next NCP pulse. Therefore, mark information M which will be read into a selected channel will be that mark information which was originally transmitted by the transmitting printing telegraph device, after it has been reconstructed by the flip-flop FO, located in the channel Fig. 8.

It may be well to look at Fig. 8 shortly. The said code of two M pulses followed by no M pulses in the 3rd, 4th, 5th and 6th intervals will pass into the cores of the synchronous part of the register and be forwarded by the SSP pulses until the two right hand cores are driven to a binary 1 state and the next four cores, reading from the right are left in their binary 0 state. As the extreme right hand core is set to its 1 state, a parallel shift pulse signal will be developed whereby the code in the synchronous part of the register will be immediately shifted to the asynchronous register. It will be noted that the invariable 1 in the right hand core of the synchronous register is registered in both the first core and the seventh core of the asynchronous register, the latter for deriving the conventional "stop" pulse of the start stop code.

It will appear that the flip-flop FO is always left ON and that therefore the invariable 1 in the first core will turn FO OFF to provide the invariable space "start" pulse of the printing telegraph code. Thereafter as in the example of the Letters Code, the second core of the asynchronous register will be in its 1 state, but the 3rd, 4th, 5th and 6th cores will be in their 0 states. Therefore, as the record in the second core is shifted out of the asynchronous register and into the flip-flop FO, the resulting pulse will turn FO ON and its output being UP will cause the number one code bit of the start stop code to be a mark pulse. Since the 3rd, 4th, 5th and 6th cores are at 0, the flip-flop FO will not be disturbed and hence its output remaining UP will cause the number 2, 3, 4 and 5 start stop signals to be mark signals.

As mentioned hereinbefore, when the invariable 1 bit reaches the extreme right hand core of the synchronous register, the parallel shift pulse is developed and passed through the PSP amplifier both to cause the shift from the synchronous register and to drive the flip-flop FSR ON. This will enable the multivibrator MV which will thereupon develop and pass through the shift pulse amplifier for the asynchronous register a series of six serial shift pulses at the conventional printing telegraph rate which will thereupon shift the start, 1, 2, 3, 4 and 5 bits out of the asynchronous register and into the flip-flop FO, into its C or OFF input and simultaneously through to OR circuit OR–4 into its D or ON input. Thus, the flip-flop FO is triggered into its opposite state by each bit emerging from the asynchronous register.

It is to be particularly noted that each of the cores Stop, 5, 4, 3, 2 and 1 have an output leading as an input into the OR circuit OR–2 and hence on each of the six serial shift pulses emitted by the multivibrator MV a bit will be forwarded through the OR circuit OR–2 to enable the inhibitor I–2 on the shift of the pulse in the stop core to the core 5, then to the core 4, then to the core 3, then to the core 2, then to the core 1, to bar the transmission of a signal to the OFF input of the flip-flop FSR. However, on the sixth serial shift pulse, as this bit originally registered in the Stop core is shifted from core 1 to core Start, no signal will get through the OR circuit OR–2 and hence the inhibitor I–2 will allow a shift pulse to flow into the F or OFF terminal of the flip-flop FSR to turn it OFF and to stop the operation of the multivibrator MV.

It is also to be noted that this last serial shift pulse will be transmitted through the OR circuit OR–4 to insure the flip-flop FO going to ON whereby the conventional stop code pulse is supplied for transmission over the printing telegraph circuit.

It may also be noted at this time that the output of the flip-flop FSR is connected to the AND circuit A–3 through the OR circuit OR–3. If, before the asynchronous register has been emptied a new code is transmitted into the synchronous register, then as the start pulse thereof is shifted into the 1 core the flip-flop FM will be turned ON and this will, by enabling the inhibitor I–1, stop the further flow of SSP pulses into the OR circuit OR–1 but at the same time will generate one more serial shift pulse by the ON movement of the flip-flop FM. As the last serial shift pulse in the asynchronous register is transmitted through the OR circuit OR–4, it is also entered into the delay multivibrator DMV–1 to turn the flip-flop FM OFF to again enable the path for the SSP pulses.

*Sequence of operations*

The sequence of operations by which the long train of mark pulses, each consisting of a change in the transmitting circuit condition, is reconstructed into various codes delivered to common apparatus in the case of synchronizing codes and to individual circuits in the case of proper codes is shown in Fig. 9.

The first graph is a representation of the information received by the binary data receiver from the transmission line and consists of the serial representation of codes for (1) the frame synchronizing character, (2) the No Character character, (3) the printing telegraph code for Letters, (4) the printing telegraph code for "A", and (5) several bits of the printing telegraph code for "C". The binary data receiver, not shown herein, is a circuit constructed and arranged to respond to the line transmission in a fairly mutilated form, not nearly so clear cut as represented herein, and to derive therefrom the receiver clock pulses RC corresponding to the master clock pulses at the distant transmitting end, to derive therefrom the delayed receiver clock pulses RCD and to change each transition of the information received into a definite mark pulse MP. For the purpose of following the operation of the data reconstruction circuit, it should be noted that each RC pulse will result in the setting of the core A into its binary 1 state and that each following RCD pulse will shift that bit out of the core A toward core C in which such bit may be lodged if the core C is not inhibited. It may be noted that each MP pulse delivered from the binary data receiver corresponds exactly in timing to the transition in the information received by the binary data receiver, but that as it is registered in core B, then shifted to core D and thereafter again shifted out of core D, it occurs two clock pulse intervals later. The two graphs 6 and 7 represent the mark pulses and the derived space pulses which control the flip-flop FRI.

The next graph A–1 represents the derivation of the so-called A–1 pulse by the clock pulse counter consisting of the chain of flip-flops F–A, F–B and F–C, the A–1 pulse being the output of the AND circuit A–1 when these three flip-flops have been simultaneously turned ON. This chain may be considered a count down counter, exhibiting a "value" equal to the binary number represented by the ON conditions of its three flip-flops. It has been fully set forth in my said copending application that when a counter capable of taking $2^x$ steps where $x$ is the number of flip-flops in the chain, is to be used for counting a lesser number, that at some point in the cycle, and preferably at the point where all go simultaneously ON, that certain ones must be reset or turned OFF and as an indication of this operation the count down values are given on the line below the A–1 graph.

The following graph represents the emission of the P6P pulse upon the start of the A–1 signal and the next graph represents the N6P pulse upon the termination of the A–1 signal. The delayed P6P pulse occurs very shortly after the P6P pulse and actually before the next RCD pulse.

The start pulse which is the result of gating the A–1 signal with the RCD pulse is shown below the P6PD and the channel selection signals are defined therebelow, being an exact duplicate of the P6PD pulses since the channel selection counter is stepped by these P6PD pulses. The NCP pulses, only derived by the synchronizing codes (or occasionally derived by other codes out of synchronism) are shown as the combination of the A–1 signal and the space signal (output of core C).

The mark and space pulses from core D and core C respectively operate the flip-flop FRI, the mark pulses turning it ON and the ST and space pulses SP turning it OFF. It will be remembered that after it has been turned ON further and following mark pulses will not change its state. Since a change in either direction of FRI will produce a so-called integrated pulse, the output of OR circuit OR–1 is termed the reconstructed mark pulse RMP.

Since the reconstructed mark pulses must not be forwarded to a register when derived from a synchronizing code, the flip-flop FNC is provided, operated by the NCP pulse and maintained in operation until the following P6PD pulse to operate the inhibitors I–1 and I–2 to bar the mark and serial shift pulses from the selected channel. The operation of the FNC flip-flop is shown below the graph of the RMP pulses and the mark M (actually the reconstructed mark pulses) and the serial shift pulses SSP which are delivered to the synchronous register are shown therebelow.

*Frame synchronization*

Assuming that the characters received are not synchronized with the counter operations, frame synchronism can be achieved by the recognition of the Frame Synchronizing Character, 001111.

The NCP pulse, which denotes the start of both "No Character" characters and the Frame Synchronizing Character, sets the flip-flop FS–1 to its ON state. If the former character is received, flip-flop FS–1 will be reset by the second bit, which is a mark pulse MP. However, if a synchronizing character is received, the output of FS–1 is gated with the second bit of the character, which is a space pulse, through AND gate A–4. The output of A–4 is stored in flip-flop FS–2, until the end of that character when pulse P6P resets it. The change of state of flip-flop FS–2, then primes the flip-flops within the decoder, thereby synchronizing the frame.

Let us assume that the decoder as shown has seven flip-flops, F–1 to F–7 inclusive, and that there are to be 50 ordinal counts to successively enable CS–1 (Channel Selection Number 1) through CS–50 and let it be further assumed that the time of CS–1 is given up to the receipt of the Frame Synchronizing Character. There may then be 49 ordinal counts starting with CS–2 to serve 49 printing telegraph channels. The flip-flops F–1 to F–7 would then successively go through a series of count down operations in which the values expressed would be 0, 127, 48, 47—to 1, inclusive. This means that when all seven of the flip-flops are ON and are thereby expressing the value 127 (which may be the condition corresponding to ordinal count 1) that at the end of this CS–1 period when the P6P pulse is developed, the output of the flip-flop FS–2 will reset the flip-flops F–1, F–2, F–3, F–4 and F–7 so that at this time as the count down value is changing from 127 to 126 it will actually change from 127 to 48. Since this means is provided to make it definite that the value 48 be attained, it is not enough that flip-flops F–1, F–2, F–3, F–4 and F–7 be reset, but it is also necessary that flip-flops F–5 and F–6 be definitely turned ON so that wherever in the count the Frame Synchronizing Character occurs, then as a result the flip-flops F–1 to F–7 will be reset to the value 0110000 (F–1=0, F–2=0, F–3=0, F–4=0, F–5=1, F–6=1 and F–7=0). The output of FS–2 will therefore be connected to the F inputs of flip-flops F–1, F–2, F–3, F–4 and F–7 and to the E inputs of flip-flops F–5 and F–6.

It will be understood that the above is by way of example only. Actually seven flip-flops are not needed in a chain which is not to be used to count less than 63, but since by the principles of the present invention larger numbers of telegraph channels (say 100) may be multiplexed, seven flip-flops are shown. By this means Frame Synchronism may be achieved.

*Character synchronism*

Character synchronism is achieved by continually interrogating the information received and by emitting from a character resynchronizing circuit a signal to reset the six count chain F–A, F–B and F–C. The pulse NCP, which resulted from gating pulses A–1 with the space pulses (SP) received is an indication of a "No Character" character. If the system is in character synchronism, this NCP pulse will be followed by five mark pulses before the pulse A–1 occurs again. Therefore by evaluating those five pulses which follow the NCP pulse, there will be an indication of whether or not the system is synchronized. If the system is out of synchronism the chain of flip-flops F–A, F–B and F–C, will be reset and the pulse A–1 will be given a new time interval.

Looking at the circuitry of Fig. 10, it will be seen that the NCP pulse will pass through the inhibitor I–3 thus setting the flip-flop FCS ON. The *a* output of FCS enables the AND circuit A–5 so that the M pulses may pass to the counting chain consisting of the flip-flops F–D, F–E and F–F until the P6P pulse resets the flip-flop FCS to its OFF state. This will normally establish a time interval which consumes five bits of information. The number of marks transmitted during this period will be counted by this chain and should equal five as the chain when reset by the application of the P6P pulse to the OFF input of the FCS flip-flop will turn F–D and F–E OFF and F–F ON (whereby this chain counts down 3, 2, 1, 0, 7, that is, 5 steps to operate the AND circuit A–8). If the count of five is complete, then the AND circuit A–8 passes an UP condition through OR circuit OR–4 to turn the flip-flop F–I OFF. It will be noted that upon the first operation to ON by the flip-flop FCS that the AND gate A–6 had been enabled whereby an RCD pulse would be passed on to turn the flip-flop F–I ON so that if during the period up to the P6P pulse exactly (and correctly) five pulses had been passed to the chain F–D, F–E and F–F, the resulting pulse from AND gate A–8 would turn the flip-flop F–I OFF.

During the ON state of flip-flop F–I, the inhibitors I–3 and I–4 are enabled to bar the NCP pulses from FCS and the N6P pulses from OR circuit OR–3.

During this period (F–I is ON) the AND circuit A–7 is enabled whereby the N6P pulse instead of passing through inhibitor I–4 will alternatively pass through AND circuit A–7 to turn flip-flop F–L ON. On the following RC pulse the flip-flop FL will be turned OFF and in that movement will emit a pulse through the OR circuit OR–3 to reset the six clock pulse counter (F–A, F–B and F–C) and through the OR circuit OR–4 to turn the flip-flop F–I OFF. Thus the normal N6P pulse used to recycle the six clock pulse counter is delayed for one clock pulse period. The pulse A–1 which originates from this counter is therefore delayed one bit upon the following cycle. As long as an indication of non synchronism is obtained, pulse A–1 will be continually delayed one bit per counter cycle, until Character Synchronism is achieved.

The Character Synchronizing circuit as above stated is arranged to properly respond to an incoming "No Character" code of six bits in the form 011111 and to cooperate in the proper operation of the rest of the circuitry. However, if Character Synchronism has been lost and the six bit intervals being counted by the six clock pulse counter actually cover the last five bits of one code being transmitted and the first bit of the next code, then the Character Synchronizing circuit will respond in another manner so as to perform its resynchronizing function. Thus, by way of example, this circuit will act in response to the last five code bits of Telegraph character:

| | |
|---|---|
| C | 01110 |
| G | 01011 |
| I | 01100 |
| L | 01001 |
| P | 01101 |
| R | 01010 |

the last four code bits of Telegraph character:

| | |
|---|---|
| F | 0110 |
| H | 0101 |
| M | 0111 |
| N | 0110 |

and many others which it is not necessary to set forth in detail.

Since the Frame Synchronizing Character 001111 does not fit this pattern of interrogation, i.e., the NCP pulse is followed by but four marks, the flip-flop F–I is immediately reset by pulse TS, derived by AND circuit A–4, transmitted through OR gate OR–4.

Once a system has gone out of character synchronism the time required to resynchronize will be of a short duration since properly synchronized characters will not be subjected to the NCP pulse to start the character resynchronizing circuit since a large number of "No Character" characters may be transmitted in both of which cases the F–I flip-flop will not operate to delay the proper transmission of the N6P pulse through the OR–3 circuit.

What is claimed is:

1. Synchronism means for use with a source of successively transmitted codes including a first group of codes, wherein each and every code is composed of the same predetermined number of individual bits, each bit having either a first or second given state, wherein the first bit of all codes of said first group are characterized by the first bit thereof having said first given state, and wherein said bits are serially transmitted at a uniform rate at given time intervals; said synchronizing means including first means responsive to said serially transmitted bits applied thereto for generating clock pulses occurring at said uniform rate, a pulse-operated counter having a counting capacity greater than said predetermined number, said counter including priming means responsive to a priming signal applied thereto for priming said counter to a first preselected count, second means for applying said clock pulses as an input to said counter to effect the count thereof, third means coupled to said counter for producing a reference signal in response to said counter registering a second preselected count, said second preselected count occurring in response to the application of one less than said predetermined number of clock pulses to said counter after a priming thereof, and fourth means coupled to said first, third and priming means for applying a priming signal to said priming means in response to the termination of a reference signal unless the bit occurring in time coincidence with the immediately preceding reference signal had said second given state and for applying a priming signal to said priming means in response to the clock pulse occurring next following the termination of a reference signal only when the bit occurring in time coincidence with the immediately preceding reference signal had said second given state.

2. The synchronism means defined in claim 8, wherein said codes further include at least one code not within said first group in which the first bit thereof has said second given state and the respective states of the remaining bits thereof are uniquely predetermined, and wherein said fourth means includes monitoring means responsive to a bit occurring in time coincidence with a reference signal having said second given state for determining from the respective states of following bits whether a valid code not within said first group exists and when such a valid code has been determined to exist causing a priming signal to be applied to said priming means in response to the termination of the next following reference signal instead of in response to the clock pulse next following the termination of the next following reference signal.

3. The synchronism means defined in claim 1, wherein said fourth means includes means for deriving a first pulse in coincidence with the initiation of a reference signal, means for deriving a second pulse in coincidence with the termination of a reference signal, means for deriving a third pulse in response to the coincidence of a reference signal and a bit having said second state, first normally conducting means for applying said second pulse and said priming signal to said priming means, first, second and third bistable means, second normally conducting means for applying said third pulse to said first bistable means to switch said first bistable means from a first stable condition thereof to a second stable condition thereof, means responsive to said first bistable means being in said second stable condition thereof and a reference signal having already terminated for switching said second bistable element subsequent to the application of a second pulse to said first normally conducting means from a first stable condition thereof to a second stable condition thereof, means responsive to said second bistable element being in said second condition for rendering said first and second normally conducting means nonconducting, means for applying said first pulse to said first bistable element for switching said first bistable element back to its first bistable condition, means responsive to said second bistable element being in said second stable condition thereof for applying said second pulse to said third bistable element for switching said third bistable element from a first stable condition thereof to a second stable condition thereof, means for applying clock pulses to said third bistable element to switch said third bistable element back to said first stable condition thereof in response to a clock pulse applied thereto, and means responsive to the switching of said third bistable means back to said first stable condition thereof for applying a priming signal to said priming means and switching said second bistable element back to said first stable condition thereof.

4. The synchronism means defined in claim 3, wherein said codes further include one code not within said first group in which the first bit thereof has said second given state and the respective states of the remaining bits thereof are uniquely predetermined, and wherein said fourth means further includes fifth means for determining the respective states of bits applied thereto, and means responsive to said first bistable element being in its second stable condition for applying bits to said fifth means, and sixth means coupled to said fifth means and said second bistable element for switching said bistable element back to its first stable condition in response to said fifth means determining that the respective states of the bits applied thereto compose said one code.

5. The synchronism means defined in claim 4, wherein said predetermined number is six and said one code is composed of a first bit having said second state followed by five bits each having said first state, and wherein said fifth means is a second counter responsive solely to bits having said first state applied thereto, and said sixth means is responsive to said fifth means counting five bits having said first state.

6. The synchronism means defined in claim 3, wherein said codes further include a frame synchronizing code characterized by both the first and second bits thereof having said second state, and further including a plurality of normally disabled output channels, a second counter means for applying successive reference signals to said second counter to count the number of reference signals applied thereto, means for selectively enabling each of said channels one at a time in accordance with the count registered in said second counter, third normally conducting means for applying said bits to all said channels, means responsive to said third pulse for rendering said third normally conducting means nonconducting, a fourth bistable element, means for applying said third pulse to said fourth bistable element for switching said fourth bistable element from a first stable condition thereof to a second stable condition thereof, means responsive to a bit having said first state for switching said fourth bistable element back to its first stable condition, and means responsive to said fourth bistable element being in said second stable condition thereof and a bit having said second state for resetting said second counter and for switching said second bistable element back to its first stable condition.

References Cited in the file of this patent

UNITED STATES PATENTS

| | | |
|---|---|---|
| 2,575,268 | Griffith | Nov. 13, 1951 |
| 2,828,362 | Darwin et al. | Mar. 25, 1958 |